US012224100B2

(12) United States Patent
Kim et al.

(10) Patent No.: US 12,224,100 B2
(45) Date of Patent: Feb. 11, 2025

(54) COIL COMPONENT

(71) Applicant: SAMSUNG ELECTRO-MECHANICS CO., LTD., Suwon-si (KR)

(72) Inventors: Jae Hun Kim, Suwon-si (KR); Byeong Cheol Moon, Suwon-si (KR); Joung Gul Ryu, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 1011 days.

(21) Appl. No.: 16/879,013

(22) Filed: May 20, 2020

(65) Prior Publication Data

US 2021/0175004 A1 Jun. 10, 2021

(30) Foreign Application Priority Data

Dec. 9, 2019 (KR) ........................ 10-2019-0162560

(51) Int. Cl.
*H01F 27/28* (2006.01)
*H01F 17/00* (2006.01)
(Continued)

(52) U.S. Cl.
CPC ..... *H01F 27/2804* (2013.01); *H01F 17/0006* (2013.01); *H01F 17/04* (2013.01);
(Continued)

(58) Field of Classification Search
CPC ........ H01F 27/30; H01F 27/306; H01F 27/32; H01F 17/0033; H01F 17/04;
(Continued)

(56) References Cited

U.S. PATENT DOCUMENTS 4,743,988 A * 5/1988 Sato ......................... G11B 5/31
11,227,716 B2 1/2022 Hur et al.
(Continued)

FOREIGN PATENT DOCUMENTS

CN 1487143 A 4/2004
CN 108154991 A 6/2018
(Continued)

OTHER PUBLICATIONS

Office Action issued in corresponding Korean Patent Application No. 10-2019-0162560 issued Mar. 2, 2021, with English translation.
(Continued)

*Primary Examiner* — Ermias T Woldegeorgis
(74) *Attorney, Agent, or Firm* — MORGAN, LEWIS & BOCKIUS LLP

(57) ABSTRACT

A coil component includes a support substrate having one surface including at least one groove portion; a coil portion disposed to contact the one surface of the support substrate; and a body embedding the support substrate and the coil portion, wherein the coil portion has an anchor portion disposed in the at least one groove portion, and a pattern portion disposed on the anchor portion and spaced apart from the one surface of the support substrate. A line width of the anchor portion is narrower than a line width of the pattern portion.

21 Claims, 4 Drawing Sheets

A

(51) Int. Cl.

| | |
|---|---|
| ***H01F 17/04*** | (2006.01) |
| ***H01F 27/30*** | (2006.01) |
| ***H01F 27/32*** | (2006.01) |
| ***H01F 41/04*** | (2006.01) |
| ***H01F 41/12*** | (2006.01) |

(52) U.S. Cl.
CPC ........... *H01F 27/306* (2013.01); *H01F 27/32* (2013.01); *H01F 41/041* (2013.01); *H01F 41/12* (2013.01); *H01F 2017/0073* (2013.01); *H01F 2017/048* (2013.01); *H01F 2027/2809* (2013.01)

(58) Field of Classification Search
CPC ........... H01F 17/045; H01F 2017/0073; H01F 2017/048; H01F 27/303; H01F 27/324; H01F 27/327
See application file for complete search history.

(56) References Cited

U.S. PATENT DOCUMENTS

| | | | | |
|---|---|---|---|---|
| 11,501,915 | B2 | 11/2022 | Bong et al. | |
| 2004/0050521 | A1 | 3/2004 | Bartelmuss | |
| 2007/0077395 | A1 | 4/2007 | Masai | |
| 2013/0038417 | A1* | 2/2013 | Kim ...................... | H01F 41/046 336/200 |
| 2015/0155093 | A1* | 6/2015 | Kim ...................... | H01F 41/046 156/314 |
| 2018/0158584 | A1 | 6/2018 | Park et al. | |
| 2018/0374626 | A1* | 12/2018 | Jang ...................... | H01F 27/323 |
| 2019/0180914 | A1 | 6/2019 | Ryu | |
| 2019/0180929 | A1 | 6/2019 | Hur et al. | |
| 2019/0311831 | A1 | 10/2019 | Yeo et al. | |
| 2019/0326055 | A1 | 10/2019 | Bong et al. | |

FOREIGN PATENT DOCUMENTS

| | | | |
|---|---|---|---|
| CN | 109903976 | A | 6/2019 |
| CN | 110364353 | A | 10/2019 |
| CN | 110391072 | A | 10/2019 |
| JP | 2004-111597 | A | 4/2004 |
| KR | 10-2007-0037428 | A | 4/2007 |
| KR | 10-2016-0034802 | A | 3/2016 |
| KR | 10-1973449 | B1 | 4/2019 |
| KR | 10-2019-0067514 | A | 6/2019 |
| KR | 10-2029582 | B1 | 10/2019 |

OTHER PUBLICATIONS

Office Action issued Nov. 3, 2023 for corresponding Chinese Patent Application No. 202010672922.2 (See English Translation).

* cited by examiner

COIL COMPONENT

CROSS-REFERENCE TO RELATED APPLICATION(S)

This application claims benefit of priority to Korean Patent Application No. 10-2019-0162560 filed on Dec. 9, 2019 in the Korean Intellectual Property Office, the disclosure of which is incorporated herein by reference in its entirety.

TECHNICAL FIELD

The present disclosure relates to a coil component.

BACKGROUND

An inductor, a coil component, is a typical passive electronic component used in electronic devices, along with a resistor and a capacitor.

In the case of a thin film type inductor, a magnetic composite sheet including magnetic metal powder particles is stacked and cured on a substrate on which a coil portion is formed using a plating process, to form a body, and external electrodes are formed on a surface of the body.

In the case of a thin film type coil component which may be one of coil components, a coil portion may be formed on a support substrate by a thin film process such as a plating process or the like, one or more magnetic composite sheets may be stacked on the support substrate on which the coil portion is formed to form a body, and an external electrode may be formed on the body.

The coil portion of the thin film type coil component may form a seed layer on the support substrate, and may form a plating layer by an electroplating process. Specifically, the coil portion may be formed by first forming a seed layer having a shape corresponding to the coil portion on one surface of the support substrate, forming a plating resist, and performing an electroplating process. Alternatively, the coil portion may be formed by forming a seed layer on the entire surface of the support substrate, forming a plating resist, performing an electroplating process, removing the plating resist, and removing a region, except for a region in which an electroplating layer is formed.

In the latter method, a post-process for removing the plating resist and the seed layer is generally performed, but there may be a problem that poor insulation may occur due to a seed layer remaining between the coil portions.

SUMMARY

An aspect of the present disclosure is to provide a coil component capable of preventing poor insulation between coil portions, and securing fixing force with a support substrate without a seed layer.

According to an aspect of the present disclosure, a coil component includes a support substrate having one surface including at least one groove portion; a coil portion disposed to contact the one surface of the support substrate; and a body embedding the support substrate and the coil portion, wherein the coil portion has an anchor portion disposed in the at least one groove portion, and a pattern portion disposed on the anchor portion and spaced apart from the one surface of the support substrate. Aline width of the anchor portion is narrower than a line width of the pattern portion.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
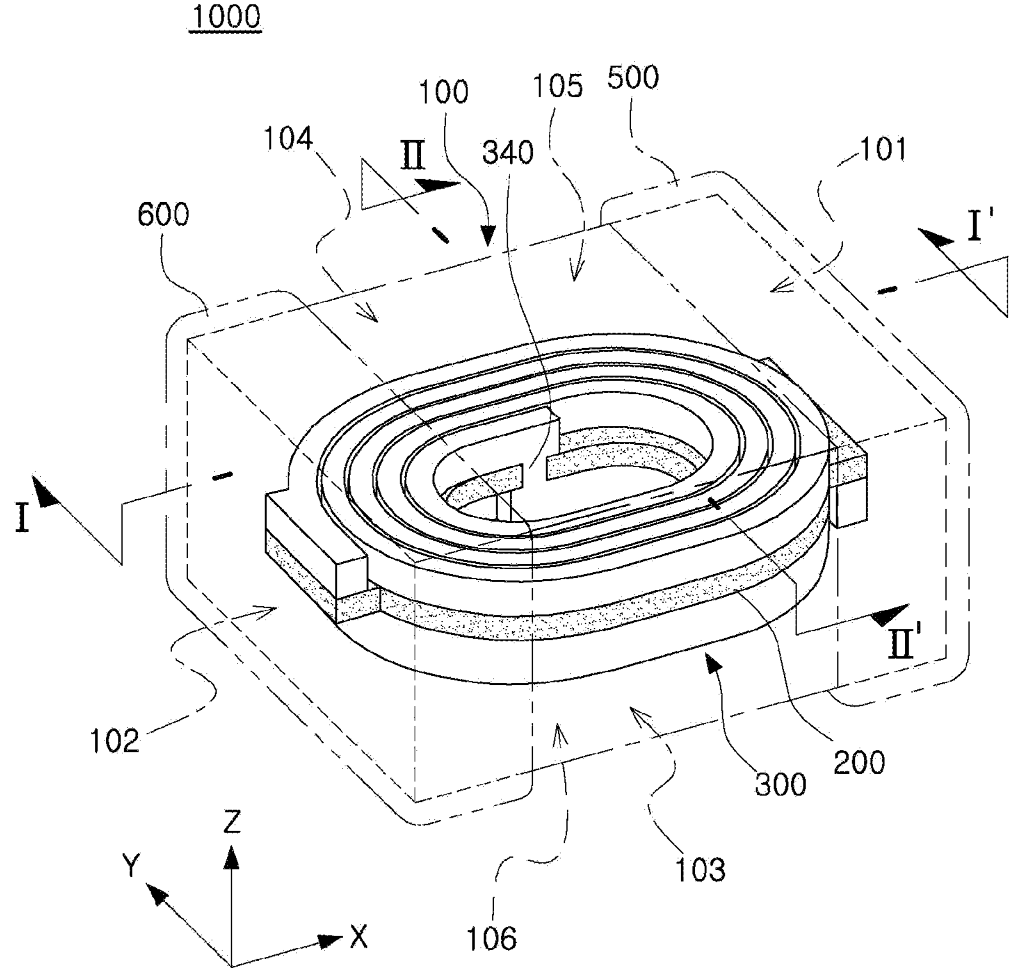
FIG. 1 is a view schematically illustrating a coil component according to an embodiment of the present disclosure.

The terms used in the description of the present disclosure are used to describe a specific embodiment, and are not intended to limit the present disclosure. A singular term includes a plural form unless otherwise indicated. The terms "include," "comprise," "is configured to," etc. of the description of the present disclosure are used to indicate the presence of features, numbers, steps, operations, elements, parts, or combination thereof, and do not exclude the possibilities of combination or addition of one or more additional features, numbers, steps, operations, elements, parts, or combination thereof. Also, the terms "disposed on," "positioned on," and the like, may indicate that an element is positioned on or beneath an object, and does not necessarily mean that the element is positioned above the object with reference to a gravity direction.

The term "coupled to," "combined to," and the like, may not only indicate that elements are directly and physically in contact with each other, but also include the configuration in which another element is interposed between the elements such that the elements are also in contact with the other component.

Sizes and thicknesses of elements illustrated in the drawings are indicated as examples for ease of description, and the present disclosure are not limited thereto.

A value used to describe a parameter such as a 1-D dimension of an element including, but not limited to, "length," "width," "thickness," diameter," "distance," "gap," and/or "size," a 2-D dimension of an element including, but not limited to, "area" and/or "size," a 3-D dimension of an element including, but not limited to, "volume" and/or "size", and a property of an element including, not limited to, "roughness," "density," "weight," "weight ratio," and/or "molar ratio" may be obtained by the method(s) and/or the tool(s) described in the present disclosure. The present disclosure, however, is not limited thereto. Other methods and/or tools appreciated by one of ordinary skill in the art, even if not described in the present disclosure, may also be used.

In the drawings, an X direction is a first direction or a length direction, a Y direction is a second direction or a width direction, and a Z direction is a third direction or a thickness direction.

Hereinafter, a coil component according to an embodiment of the present disclosure will be described in detail with reference to the accompanying drawings. Referring to the accompanying drawings, the same or corresponding components may be denoted by the same reference numerals, and overlapped descriptions will be omitted.

In electronic devices, various types of electronic components may be used, and various types of coil components may be used between the electronic components to remove noise, or for other purposes.

In other words, in electronic devices, a coil component may be used as a power inductor, a high frequency (HF) inductor, a general bead, a high frequency (GHz) bead, a common mode filter, and the like.

Figure 2:
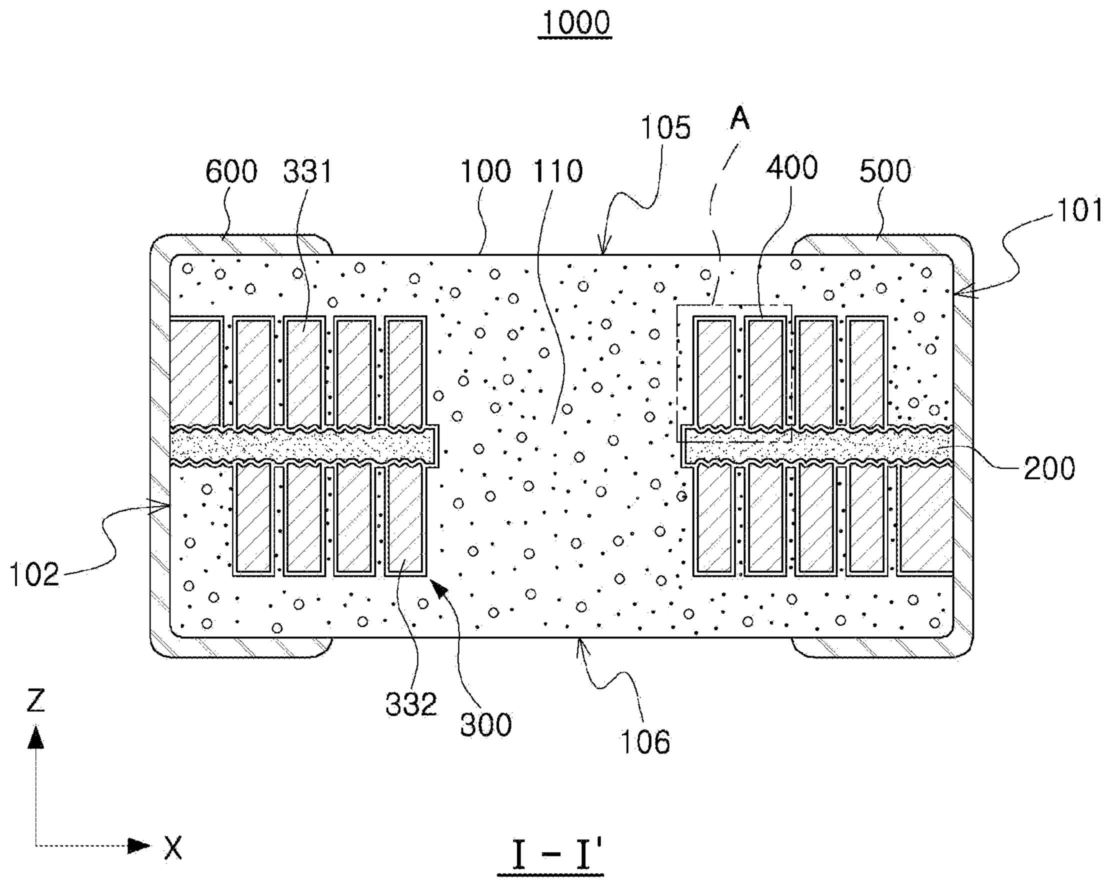
FIG. 2 is a cross-sectional view taken along line I-I' of FIG. 1.
Figure 3:
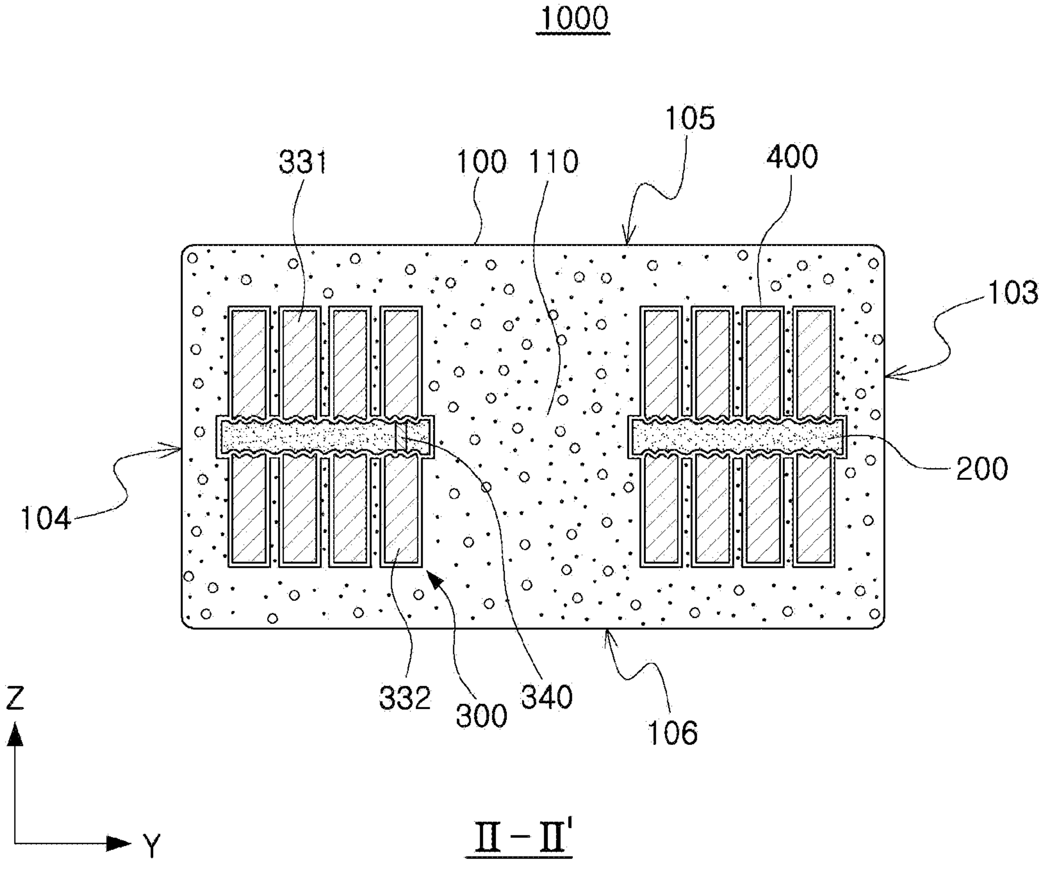
FIG. 3 is a cross-sectional view taken along line II-II' of FIG. 1.
Figure 4:
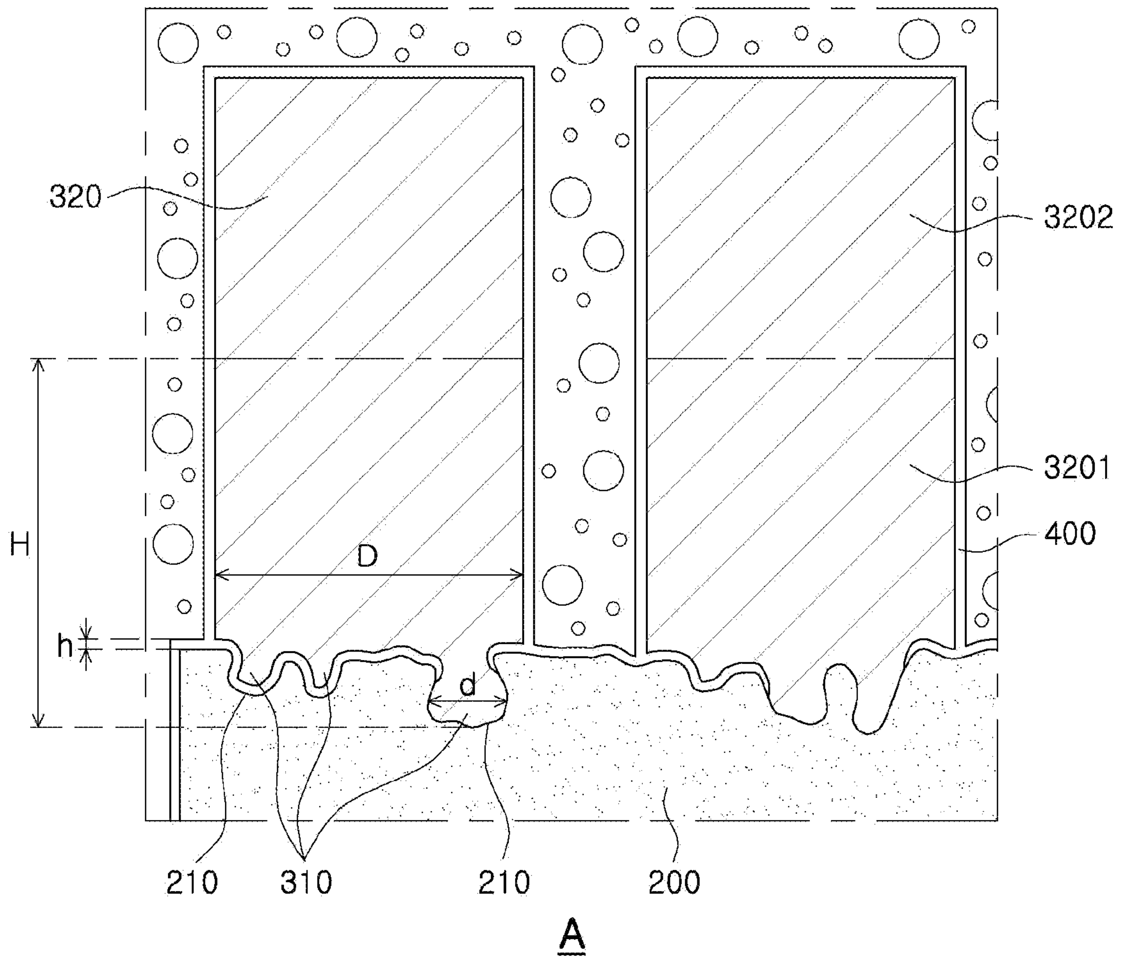
FIG. 4 is an enlarged view of portion A of FIG. 2.

FIG. 1 is a view schematically illustrating a coil component according to an embodiment of the present disclosure. FIG. 2 is a cross-sectional view taken along line I-I' of FIG. 1. FIG. 3 is a cross-sectional view taken along line II-II' of FIG. 1. FIG. 4 is an enlarged view of portion A of FIG. 2.

Referring to FIGS. 1 to 4, a coil component 1000 according to an embodiment of the present disclosure may include a body 100, a support substrate 200, and a coil portion 300, and may further include an insulating layer 400, and external electrodes 500 and 600.

The body 100 may form an exterior of the coil component 1000 according to this embodiment, and may embed the support substrate 200 and the coil portion 300 therein.

The body 100 may be formed to have a hexahedral shape overall.

Referring to FIGS. 1 to 3, the body 100 may include a first surface 101 and a second surface 102 opposing each other in a length direction X, a third surface 103 and a fourth surface 104 opposing each other in a width direction Y, and a fifth surface 105 and a sixth surface 106 opposing each other in a thickness direction Z. Each of the first to fourth surfaces 101, 102, 103, and 104 of the body 100 may correspond to wall surfaces of the body 100 connecting the fifth surface 105 and the sixth surface 106 of the body 100.

The body 100 may be formed such that the coil component 1000 according to this embodiment in which the external electrodes 500 and 600 to be described later are formed has a length of 2.0 mm, a width of 1.2 mm, and a thickness of 0.65 mm, but is not limited thereto. Alternatively, the body 100 may be formed such that the coil component 1000 according to this embodiment in which the external electrodes 500 and 600 to be described later are formed has a length of 2.0 mm, a width of 1.6 mm, and a thickness of 0.55 mm. Alternatively, the body 100 may be formed such that the coil component 1000 according to this embodiment in which the external electrodes 500 and 600 to be described later are formed has a length of 2.0 mm, a width of 1.2 mm, and a thickness of 0.55 mm. Alternatively, the body 100 may be formed such that the coil component 1000 according to this embodiment in which the external electrodes 500 and 600 to be described later are formed has a length of 1.2 mm, a width of 1.0 mm, and a thickness of 0.55 mm. Since the above-described sizes of the coil component 1000 according to this embodiment are merely illustrative, cases in which sizes are other than the above-mentioned sizes may be not excluded from the scope of the present disclosure.

The body 100 may include a magnetic powder particle and an insulating resin. Specifically, the body 100 may be formed by stacking one or more magnetic composite sheets including the insulating resin and the magnetic powder particle dispersed in the insulating resin, and then curing the magnetic composite sheets. The body 100 may have a structure other than the structure in which the magnetic powder particle may be dispersed in the insulating resin. For example, the body 100 may be made of a magnetic material such as ferrite.

The magnetic powder particle may be, for example, a ferrite powder particle or a metal magnetic powder particle.

Examples of the ferrite powder particle may include at least one or more of spinel type ferrites such as Mg—Zn-based ferrite, Mn—Zn-based ferrite, Mn—Mg-based ferrite, Cu—Zn-based ferrite, Mg—Mn—Sr-based ferrite, Ni—Zn-based ferrite, and the like, hexagonal ferrites such as Ba—Zn-based ferrite, Ba—Mg-based ferrite, Ba—Ni-based ferrite, Ba—Co-based ferrite, Ba—Ni—Co-based ferrite, and the like, garnet type ferrites such as Y-based ferrite, and the like, and Li-based ferrites.

The metal magnetic powder particle may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the metal magnetic powder particle may be at least one or more of a pure iron powder, a Fe—Si-based alloy powder, a Fe—Si—Al-based alloy powder, a Fe—Ni-based alloy powder, a Fe—Ni—Mo-based alloy powder, a Fe—Ni—Mo—Cu-based alloy powder, a Fe—Co-based alloy powder, a Fe—Ni—Co-based alloy powder, a Fe—Cr-based alloy powder, a Fe—Cr—Si-based alloy powder, a Fe—Si—Cu—Nb-based alloy powder, a Fe—Ni—Cr-based alloy powder, and a Fe—Cr—Al-based alloy powder.

The metallic magnetic powder particle may be amorphous or crystalline. For example, the metal magnetic powder particle may be a Fe—Si—B—Cr-based amorphous alloy powder, but is not limited thereto.

The ferrite powder and the metal magnetic powder particle may have an average diameter of about 0.1 μm to 30 μm, respectively, but are not limited thereto.

The body 100 may include two or more types of magnetic powder particles dispersed in an insulating resin. In this case, the term "different types of magnetic powder particle" means that the magnetic powder particles dispersed in the insulating resin are distinguished from each other by diameter, composition, crystallinity, and a shape. For example, the body 100 may include two or more magnetic powder particles of different diameters.

The insulating resin may include an epoxy, a polyimide, a liquid crystal polymer, or the like, in a single form or in combined forms, but is not limited thereto.

The body 100 may include a core 110 passing through the support substrate 200 and the coil portion 300 to be described later. The core 110 may be formed by filling at least a portion of the magnetic composite sheet with through-holes of the coil portion 300 in operations of stacking and curing the magnetic composite sheet, but is not limited thereto.

The support substrate 200 may have one surface and the other surface opposing each other, and may be embedded in the body 100, together with the coil portion 300 to be described later. The support substrate 200 may be configured to support the coil portion 300. In this embodiment, for convenience of description, the one surface of the support substrate 200 may be described, but the present disclosure is not limited thereto, and the description of the one surface of the support substrate 200 may be similarly applied to the other surface of the support substrate 200.

The support substrate 200 may be formed of an insulating material including a thermosetting insulating resin such as an epoxy resin, a thermoplastic insulating resin such as polyimide, or a photosensitive insulating resin, or may be formed of an insulating material in which a reinforcing material such as a glass fiber or an inorganic filler is impregnated with such an insulating resin. For example, the support substrate 200 may be formed of an insulating material such as a copper clad laminate (CCL), prepreg, Ajinomoto Build-up Film (ABF), FR-4, a bismaleimide triazine (BT) film, a photoimageable dielectric (PID) film, and the like, but are not limited thereto.

As the inorganic filler, at least one or more selected from a group consisting of silica ($SiO_2$), alumina ($Al_2O_3$), silicon carbide (SiC), barium sulfate ($BaSO_4$), talc, mud, a mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$) may be used.

When the support substrate 200 is formed of an insulating material including a reinforcing material, the support substrate 200 may provide better rigidity. When the support substrate 200 is formed of an insulating material not containing glass fibers, the support substrate 200 may be advantageous for reducing a thickness of the overall coil portion 300. When the support substrate 200 is formed of an insulating material containing a photosensitive insulating resin, the number of processes for forming the coil portion 300 may be reduced. Therefore, it may be advantageous in reducing production costs, and a fine via may be formed.

Referring to FIGS. 2 to 4, the support substrate 200 may have one surface including at least one groove portion 210. An average roughness (Ra) of the one surface of the support substrate 200 on which the groove portion 210 is formed may be 1 μm or more and 5 μm or less, preferably 2.2 μm. An average roughness (Ra) may be measured using a 3D Profiler, for example, VK-9700 manufactured by KEYENCE. A 3D Profiler is a 3D measuring device capable of measuring average roughness and surface shape. An average roughness (Ra) of the support substrate 200 may refer to an average value of the measured roughness of the support substrate 200. For example, an average roughness (Ra) may be measured by measuring depths of the plurality of groove portions formed on the support substrate 200, respectively, and then calculating an arithmetic mean value of these measurements.

When the average roughness (Ra) is less than 1 μm, an anchor portion 310 to be described below may not be formed to a sufficient size. Therefore, fixing force between the support substrate 200 and the coil portion 300 may be relatively weakened. When the average roughness (Ra) is greater than 5 μm, rigidity of the support substrate 200 may be relatively weakened, which may be disadvantageous to formation of the coil portion 300 having a relatively high aspect ratio. In general, a roughness having a numerical range of 0.05 μm to 0.5 μm may be formed on the support substrate in order to strengthen the fixing force between the support substrate and the coil portion. For example, by forming the groove portion 210 having a relatively larger average roughness (Ra) than in the related art, fixing force between the coil portion 300 and the support substrate 200 may be secured, without a seed layer described later. The groove portion 210 may be formed by disposing a copper foil layer (not illustrated) on at least the one surface of the support substrate 200, and then removing the copper foil layer (not illustrated). For example, a copper foil layer (not illustrated) having a surface with a roughness of a predetermined size or more may be attached to the one surface of the support substrate 200. Thereafter, by removing the copper foil layer (not illustrated), the groove portion 210 having the above-described average roughness (Ra) may be formed on the one surface of the support substrate 200. In this embodiment, the surface roughness of the copper foil layer (not illustrated) is not limited, but in order to form the groove portion 210, a thickness of the copper foil layer (not illustrated) may be sufficiently thick. Referring to FIG. 4, the groove portion 210 may be formed on a surface of the support substrate 200 to be spaced apart from each other. A shape and a size of the groove portion 210 are not particularly limited as long as the groove portion 210 may be inserted into the support substrate 200 to secure fixing force with the coil portion 300. In one example, an average roughness (Ra) of one surface of the coil portion 300 facing the support substrate 200 may be greater than an average roughness (Ra) of another surface of the coil portion 300 opposing the one surface.

A thickness of the support substrate 200 may be 10 μm or more and 60 μm or less, and more preferably 20 μm or more and 60 μm or less. The thickness of the supporting substrate 200 may be measured, for example, by measuring a thickness of the cross section of the copper clad laminate (CCL) through an optical microscope. As an example, the magnification of the optical microscope may be set to 200 times. The thickness of the supporting substrate 200 may be, for example, a median value of 10 μm or more and 60 μm or less. The thickness of the supporting substrate may be measured by measuring the maximum and minimum values of the thickness of the supporting substrate and calculating the median of these values. When the thickness of the support substrate 200 is less than 20 μm, it may be difficult to secure rigidity of the support substrate 200. Therefore, it may be difficult to support the coil portion 300 to be described later in the manufacturing process. When the thickness of the support substrate 200 is greater than 60 μm, it may be disadvantageous to make the coil portion thinner, and it may be disadvantageous in realizing relatively high inductance, since a volume occupied by the support substrate 200 in the body of the same volume increases.

The coil portion 300 may be disposed to have a planar spiral shape, to contact at least the one surface of the support substrate 200, and may be embedded in the body 100, to manifest the characteristics of the coil component. For example, when the coil component 1000 of this embodiment is used as a power inductor, the coil portion 300 may function to stabilize the power supply of an electronic device by storing an electric field as a magnetic field and maintaining an output voltage.

Referring to FIG. 4, the coil portion 300 may include an anchor portion 310 disposed in the groove portion 210 and a pattern portion 320 disposed on the anchor portion 310. Since the anchor portion 310 is inserted into the groove portion 210 of the support substrate 200, the anchor portion 310 may be disposed toward a central portion of the support substrate 200. A shape of the anchor portion 310 may correspond to a shape of the groove portion 210 of the support substrate 200. An area occupied by the anchor portion 310 embedded by the one surface of the support substrate 200 may be smaller than an area occupied by the pattern portion 320 formed in the outside of the support substrate 200. For example, in this embodiment, since the groove portion 210 is formed by attaching and removing the copper foil layer, a line width of the groove portion 210 hardly exceeds a line width of each coil patterns 331 and 332. As a result, referring to FIG. 4, a line width (d) of the anchor portion 310 disposed in the groove portion 210 may be also smaller than a line width (D) of the pattern portion 320. In one example, a line width may refer to a dimension determined in a direction from an inner coil pattern to an outer coil pattern in a cross-sectional view perpendicular to an X-Y plane. The definition of the line width, however, is not limited thereto.

The coil portion 300 may include first and second coil patterns 331 and 332, and a via 340. Based on the direction of FIGS. 1, 2 and 3, the first coil pattern 331 may be disposed on the one surface of the support substrate 200 facing the sixth surface 106 of the body 100, and the second coil pattern 332 may be disposed on the other surface of the support substrate 200 facing the one surface of the support substrate 200. Referring to FIGS. 2 to 4, each of the first and second coil patterns 331 and 332 may include at least one of the anchor portion 310 and the pattern portion 320. In addition, each of the first and second coil patterns 331 and 332 may have a plurality of turns. The anchor portion 310 may be provided as a plurality of anchor portions spaced apart from each other, based on any one of the plurality of turns. For example, each of the pattern portions 320 of each of the first and second coil patterns 331 and 332 may have at least one anchor portion 310. In this embodiment, since the groove portion 210 is formed by the removal of the above-described copper foil layer (not illustrated), the groove portion 210 may be formed in any of the length direction X and the width direction Y of the body 100, and a shape and a position the groove portion 210 may be irregular or discontinuous.

Referring to FIGS. 1 and 3, the via 340 may pass through the support substrate 200, and may be in contact with and connected to the first coil pattern 331 disposed on the one surface of the support substrate 200 and the second coil pattern 332 disposed on the other surface of the support substrate 200. As a result, the coil portion 300 may function as one coil in which one or more turns are formed around the core 110 as a whole.

End portions of the coil portion 300 may be connected to the first and second external electrodes 500 and 600, which will be described later. Referring to FIGS. 1 and 2, an end portion of the first coil pattern 331 may be exposed from the second surface 102 of the body 100, to be connected to the second external electrode 600, and an end portion of the second coil pattern 332 may be exposed from the first surface 101 of the body 100, to be connected to the first external electrode 500.

Referring to FIG. 4, the coil portion 300 may include the pattern portion 320 spaced apart from the one surface of the support substrate 200. The coil portion 300 may include the anchor portion 310 embedded by the one surface of the support substrate 200, and the pattern portion 320 connected to the anchor portion 310 and protruding from the one surface of the support substrate 200.

Referring to FIGS. 2 to 4, each of the first and second coil patterns 331 and 332 may include a lower plating layer 3201 adjacent to the support substrate 200 and including the anchor portion 310 and a portion of the pattern portion 320 extending from the anchor portion 310, and an upper plating layer 3202 including another portion of the pattern portion disposed on the lower plating layer 3201. For example, each of the first and second coil patterns 331 and 332 may include a lower plating layer 3201 disposed to be closest to the support substrate 200, and an upper plating layer 3202 disposed on the lower plating layer 3201. As described later, since a seed layer is removed by a seed etchant or the like, a separation distance between the support substrate 200 and the pattern portion 320 may be generated by a region from which the seed layer is removed. Since the lower plating layer 3201 is an electroplating layer formed before the seed layer is removed, a thickness of the lower plating layer 3201 may be thicker than a region corresponding to a thickness of the seed layer. As a result, referring to FIG. 4, a distance (H) of the lower plating layer 3201 in the thickness direction may be greater than a separation distance (h) between the pattern portion 320 and the support substrate 200. In addition, since the insulating layer 400 to be described later is disposed in the region from which the seed layer is removed, insulation characteristics between the pattern portions 320 may be further secured as the seed layer is removed.

In this embodiment, a seed layer (not illustrated) may be first formed on one surface and the other surface of a support substrate 200 in which a groove portion 210 is formed. The seed layer may not remain in a final structure of a coil component 1000 of this embodiment, but may be formed to fabricate lower and upper plating layers 3201 and 3202 by an electrolytic plating process. The seed layer may be formed by performing a sputtering process or an electroless plating process on the support substrate 200. The seed layer may not be completely disposed on the one surface of the support substrate 200. For example, the seed layer may not be completely disposed in the groove portion 210, depending on a depth of the groove portion 210 formed in the support substrate 200 or strength of the sputtering process. As a result, referring to FIG. 4, the anchor portion 310 and the one surface of the support substrate 200 may partially contact each other, and fixing force between the support substrate 200 and the coil portion 300 may be further strengthened. The seed layer may include at least one of molybdenum (Mo), titanium (Ti), chromium (Cr), or copper (Cu). The seed layer may be formed in a plurality of layers, such as molybdenum (Mo)/titanium (Ti), but is not limited thereto. In this embodiment, since the seed layer is removed, the coil portion 300 may not include molybdenum (Mo).

The lower plating layer 3201 may be formed by forming a plating resist having an opening in the seed layer, and then filling the opening of the plating resist with a conductive material by an electrolytic plating process. The plating resist may be formed in a form including an insulating wall disposed between the opening formed in a planar spiral shape having a plurality of turns and an adjacent opening, by forming a plating resist forming material on the seed layer and then performing a photolithography process thereon. The plating resist may be formed by applying a liquid photosensitive material to the seed layer or stacking a sheet type photosensitive material to the seed layer. A width of the opening of the plating resist (or a separation distance between adjacent insulating walls) may correspond to a width of the pattern portion 320, and a width of the insulating wall may correspond to a separation distance between turns of the pattern portion 320 described above. A thickness of the insulating wall may correspond to a height of the pattern portion 320 described above. The plating resist may include a photosensitive insulating material (a photo imageable dielectric (PID)) that may be peeled off by a stripper. For example, the plating resist may include a photosensitive material including as a main component a cyclic ketone compound, and an ether compound having a hydroxy group, wherein the cyclic ketone compound is, for example, cyclopentanone or the like, and the ether compound having a hydroxy group is, for example, polypropylene glycol monomethyl ether or the like.

Alternatively, the plating resist may include a photosensitive material including a bisphenol-based epoxy resin as a main component, wherein the bisphenol-based epoxy resin is, for example, bisphenol A novolac epoxy resin, bisphenol A diglycidyl ether bisphenol A polymer resin, or the like. However, the scope of the present disclosure is not limited thereto, and the plating resist may be applied to any one as long as it may be peeled off by the stripper.

The lower and upper plating layers 3201 and 3202 may include copper (Cu). For example, the lower and upper plating layers 3201 and 3202 may be made of copper (Cu)

by an electrolytic copper plating process, but the scope of the present disclosure is not limited thereto. As a result, both the anchor portion 310 and the pattern portion 320 may include copper (Cu), and the lower plating layer 3201 may be integrally formed. The lower and upper plating layers 3201 and 3202 and the seed layer may be made of different metals. The lower and upper plating layers 3201 and 3202 may be formed as a single layer by a single electroplating process, or may be formed as a plurality of layers by a plurality of electroplating processes. For example, the anchor portion 310 and the pattern portion 320 may be formed as a single metal layer without an interface between each other.

In this embodiment, after forming the lower plating layer 3201 on the seed layer, the plating resist may be chemically removed using a stripper, and the seed layer may be removed using a seed etching solution. The stripper may include a high concentration of strong acid, and the seed etching solution may selectively react with the seed layer. The seed etching solution may react with the seed layer, and may not react with the electroplating layer, which may be the lower plating layer 3201. As a result, in this embodiment, the seed layer remaining around the lower plating layer 3201 may be removed.

A via 340 may include at least one plating layer. For example, when a via 340 is formed by an electroplating process, the via 340 may include a seed layer formed on an inner wall of a via hole penetrating the support substrate 200, and an electroplating layer filling the via hole on which the seed layer is formed. The seed layer of the via 340, and the seed layer for forming the coil portion 300 may be formed together in the same process to be integrally formed, or may be formed in different processes to forma boundary between them. The via 340 may include a conductive material such as copper (Cu), aluminum (Al), silver (Ag), tin (Sn), gold (Au), nickel (Ni), lead (Pb), titanium (Ti), chromium (Cr), molybdenum (Mo), or alloys thereof. In this embodiment, since the lower plating layer 3201 is formed on the seed layer, the plating resist is chemically removed using a stripper, and the seed layer is removed using a seed etching solution, the seed layer of the via 340 may not also remain.

The external electrodes 500 and 600 may have a single-layer structure or a multilayer structure. For example, the first external electrode 500 may include a first layer (not illustrated) including copper (Cu), a second layer (not illustrated) disposed on the first layer (not illustrated) and including nickel (Ni), and a third layer (not illustrated) disposed on the second layer (not illustrated) and including tin (Sn). In this case, the first to third layers (not illustrated) may be formed by a plating process, respectively, but are not limited thereto. As another example, the first external electrode 500 may include a resin electrode including a conductive powder particle such as silver (Ag) or the like, and a resin, and a nickel (Ni)/tin (Sn) plating layer plated on the resin electrode.

The external electrodes 500 and 600 may be formed of a conductive material such as copper (Cu), aluminum (Al), silver (Ag), tin (Sn), gold (Au), nickel (Ni), lead (Pb), titanium (Ti), or alloys thereof, but are not limited thereto.

The insulating layer 400 may insulate between the coil portion 300 and the body 100. For example, the insulating layer 400 may be formed to surround the support substrate 200 and the coil portion 300. Referring to FIGS. 2 to 4, the insulating layer 400 may be disposed in a space between the pattern portion 320 and the one surface of the support substrate 200.

The insulating layer 400 may be provided to insulate the coil portion 300 from the body 100, and may include a known insulating material such as parylene, and the like. An insulating material included in the insulating layer 400 may be any insulating material, and is not particularly limited thereto. The insulating layer 400 may be formed using a vapor deposition process or the like, but not limited thereto, and may be formed using stacking an insulation film on both surfaces of the support substrate 200. In the former case, the insulating layer 400 may be formed in the form of a conformal film along the surfaces of the support substrate 200 and the coil portion 300. In the latter case, the insulating layer 400 may be formed to fill a space between neighboring pattern portions 320, and a space between the anchor portion 310 and the support substrate 200. The insulating layer 400 in the present disclosure may be an optional configuration, and the insulating layer 400 may be omitted, when the body 100 secures sufficient insulation resistance under operating conditions of the coil component 1000 according to this embodiment.

According to the present disclosure, poor insulation between the coil portions may be prevented and fixing force with the support substrate without the seed layer may be secured.

While embodiments have been illustrated and described above, it will be apparent to those skilled in the art that modifications and variations could be made without departing from the scope of the present disclosure as defined by the appended claims.

What is claimed is:

1. A coil component comprising:

a support substrate having one surface including at least one groove portion;

a coil portion disposed to contact the one surface of the support substrate; and a body embedding the support substrate and the coil portion, wherein the coil portion has an anchor portion disposed in the at least one groove portion, and a pattern portion disposed on the anchor portion and spaced apart from the one surface of the support substrate, wherein a line width of the anchor portion is narrower than a line width of the pattern portion, wherein the coil portion has a plurality of turns, and wherein the anchor portion of one of the plurality of turns includes a plurality of anchors spaced apart from each other in a region where the line width of the pattern portion is defined.

2. The coil component according to claim 1, wherein the coil portion comprises first and second coil patterns respectively disposed on the one surface and the other surface of the support substrate, wherein each of the first and second coil patterns comprises the anchor portion and the pattern portion.

3. The coil component according to claim 2, wherein each of the first and second coil patterns comprises:

a lower plating layer adjacent to the support substrate and including the anchor portion and a portion of the pattern portion extending from the anchor portion; and an upper plating layer including another portion of the pattern portion disposed on the lower plating layer, different from the portion of the pattern portion, wherein a thickness of the lower plating layer in a thickness direction is greater than a separation distance between the pattern portion and the support substrate.

4. The coil component according to claim 3, wherein the lower plating layer is integrally formed.

5. The coil component according to claim 2, wherein each of the first and second coil patterns has a plurality of turns, and wherein the anchor portion of each of the plurality of turns of the first and second coil patterns includes a plurality of anchors spaced apart from each other.

6. The coil component according to claim 1, further comprising an insulation layer disposed between the coil portion and the body.

7. The coil component according to claim 6, wherein in the at least one groove portion, the coil portion is in contact with a portion of the support substrate.

8. The coil component according to claim 1, wherein an average roughness (Ra) of the one surface of the support substrate on which the groove portion is formed is 1 μm or more and 5 μm or less.

9. The coil component according to claim 1, wherein a thickness of the support substrate is 10 μm or more and 60 μm or less.

10. The coil component according to claim 1, wherein the coil portion contains copper (Cu).

11. The coil component according to claim 1, wherein the coil portion does not contain molybdenum (Mo).

12. The coil component according to claim 1, wherein a shape of the anchor portion corresponds to a shape of the groove portion.

13. The coil component according to claim 1, wherein the anchor portion is disposed in the groove portion, and is disposed toward a central portion of the support substrate.

14. The coil component according to claim 1, wherein in a cross-section of the coil component, the plurality of anchors of the anchor portion of the one of the plurality of turns extend from the one of the plurality of turns into the support substrate.

15. A coil component comprising:

a support substrate having one surface including first and second groove portions having different depths;

a coil portion disposed on one surface of the support substrate; and a body embedding the support substrate and the coil portion, wherein the coil portion has first and second anchor portions respectively disposed in the first and second groove portions in the support substrate, and a pattern portion connected to the first and second anchor portions and protruding from the one surface of the support substrate, wherein the pattern portion is spaced apart from the one surface of the support substrate, and wherein a plurality of turns of the coil portion are spaced apart from each other in a cross-section of the coil component, and in the cross-section of the coil component, the first and second anchor portions extend from a same turn among the plurality of turns of the coil portion.

16. The coil component according to claim 15, further comprising an insulation layer insulating between the coil portion and the body, wherein the insulation layer is disposed in a space between the pattern portion and the one surface of the support substrate.

17. The coil component according to claim 16, wherein in the one or more of the plurality of groove portions, the coil portion is in contact with a portion of the support substrate.

18. A coil component comprising:

a support substrate;

a coil portion including an anchor portion embedded in the support substrate, and a pattern portion extending from the anchor portion and protruding from the support substrate;

a body embedding the support substrate and the coil portion; and an insulating layer disposed between the pattern portion and the support substrate, wherein an average roughness (Ra) of one surface of the coil portion facing the support substrate is greater than an average roughness (Ra) of another surface of the coil portion opposing the one surface of the coil portion.

19. The coil component according to claim 18, wherein the anchor portion and the pattern portion comprises a same material.

20. The coil component according to claim 19, wherein the same material contained in the pattern portion is in contact with the insulating layer.

21. The coil component according to claim 18, wherein the coil portion is in contact with a portion of the support substrate.

* * * * *